July 3, 1956  
C. E. READ  
2,753,007  
COMBINATION SWAY BAR LATERAL STRUT AND  
AXLE STABILIZER FOR VEHICLES  
Filed Nov. 3, 1954  
2 Sheets-Sheet 1
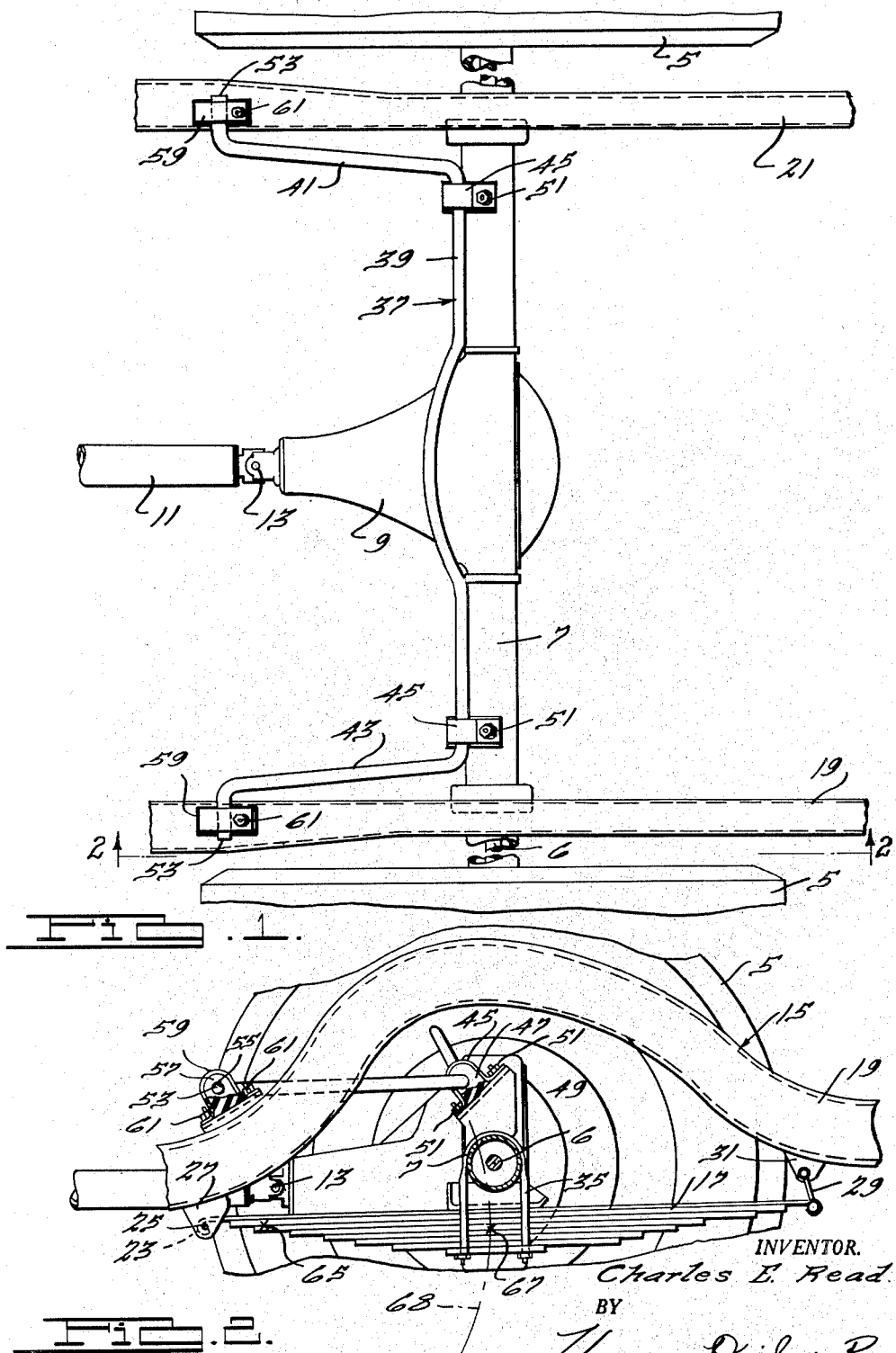
INVENTOR.  
Charles E. Read  
BY  
Harness, Dickey & Pierce  
ATTORNEYS INVENTOR.
Charles E. Read
BY
Harness, Dickey & Pierce
ATTORNEYS

2,753,007

COMBINATION SWAY BAR LATERAL STRUT AND AXLE STABILIZER FOR VEHICLES

Charles E. Read, Monroe, Mich., assignor to Monroe Auto Equipment Company, Monroe, Mich., a corporation of Michigan Application November 3, 1954, Serial No. 466,650

5 Claims. (Cl. 180—85)

This invention relates generally to a vehicle ride control device and more particularly to a combination sway bar, lateral strut and axle stabilizer device for vehicles.

In most automotive vehicles of today the rear portion of the automobile frame is sprung on the rear axle housing through suitable springs. While the portion of the rear axle housing carrying the rear axle extends generally laterally of the vehicle, the portion containing the differential driving members projects forwardly to provide in effect a nose portion. The portion of the differential within the housing nose portion is connected to the rear end of the propeller or drive shaft of the vehicle through a universal joint. As a result the application of the vehicle wheel brakes or the application of power through the drive shaft tends to rotate the axle housing about its axis causing the nose portion thereof to swing upwardly or downwardly, which movement, taken in combination with the normal upward and downward movement of the vehicle frame relative to the axle housing, may cause the axle housing nose portion to strike the vehicle frame or a portion of the vehicle body and may cause early fatiguing or failure of the universal joint between the drive shaft and differential. It is therefore desirable to prevent rotation of the axle housing about its axis if at all possible. Still further, as is well known, lateral movement between the vehicle frame and the axle housing may occur because of spring deflection and when a vehicle travels around a corner one side of the vehicle frame may drop below the other side, causing the body to tilt and thus providing an undesirable condition. It is therefore desirable to eliminate lateral movement of the vehicle frame and body relative to the vehicle axle and to prevent or at least materially reduce tilting of the vehicle frame relative to the axle.

It is an object of this invention to provide a single device which will prevent rotation of the axle housing, will act as a lateral stabilizer between the axle housing and the vehicle frame, and which acts as an antisway or roll device for preventing or materially reducing tilting of the automobile frame and body relative to the axle and ground engaging wheels.

It is a further object of this invention to provide a device of the aforementioned type which confines the relative movement between the vehicle frame and the vehicle axle housing to a predetermined path.

It is a still further object of this invention to provide a device of the aforementioned type which may be easily adapted to various types of vehicles and suspensions and which may be connected with the vehicle frame and axle to produce a desired result.

It is a still further object of this invention to provide a device of the aforementioned type which includes a one piece bar structure and relatively simple and inexpensive means for attaching the bar to the axle housing and to the vehicle frame.

It is a still further object of this invention to provide a device of the aforementioned type which is durable and efficient in use, inexpensive and simple to manufacture, and extremely efficient in operation.

These and other objects of this invention will become apparent from the following detailed description, taken in conjunction with the accompanying drawings, in which:

Figure 1 is a fragmentary top elevational view of a portion of a vehicle illustrating the device of this invention connected between the vehicle frame and the rear axle housing of a conventional automotive vehicle;

Fig. 2 is a view, partially in section and partially in elevation, of the structure illustrated in Figure 1, taken along the line 2—2 thereof;

Figure 3:
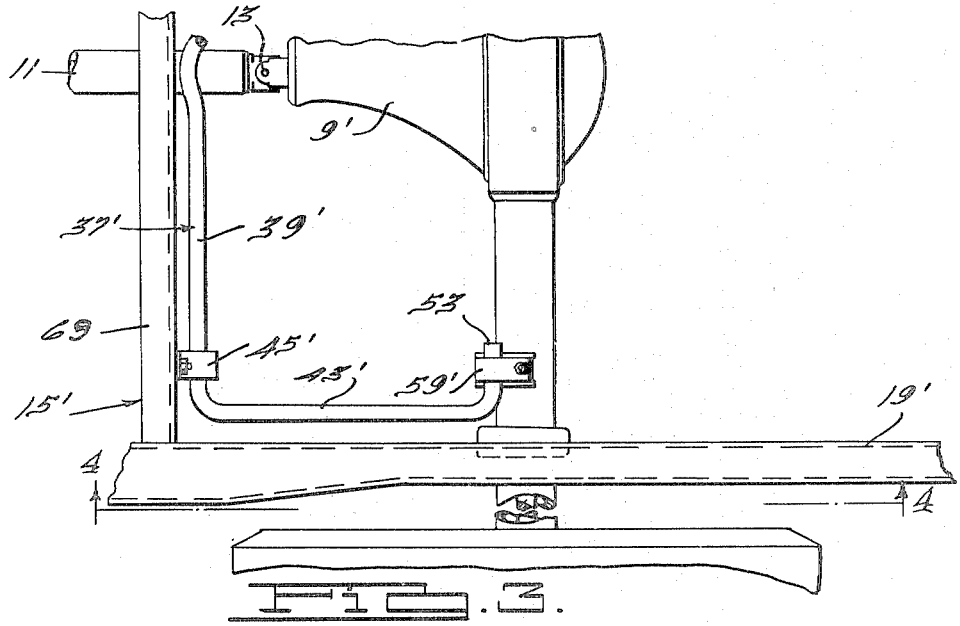
Fig. 3 is a fragmentary top elevational view similar to Figure 1, but of only one side of the vehicle, illustrating a further embodiment of the invention.

Referring now to the drawings and more particularly to Figures 1 and 2, it will be seen that a portion of a conventional automotive vehicle is illustrated, which includes ground engaging wheels 5 adjacent each side of the vehicle at the rear portion thereof. The ground engaging wheels 5 are supported in a conventional manner on the opposite ends of a rear axle disposed within a tubular rear axle housing member 7 of a conventional type and design. The intermediate portion of the rear axle housing 7 is enlarged and has a forwardly projecting nose portion 9 to accommodate the conventional differential which connects the rear axle with the vehicle propeller or drive shaft 11 through a conventional universal joint 13. A vehicle frame 15 is sprung on the rear axle housing, adjacent each side thereof, by means of a leaf spring 17. The vehicle frame includes in the usual manner, longitudinal frame members 19 and 21 on opposite sides of the vehicle and each leaf spring 17 is pivotally connected at its opposite ends to each of the frame members 19 and 21. The forward end of each leaf spring 17 is provided with an eye portion 23, which is pivotally supported on a pin 25 connected with each longitudinal frame member 19 by suitable brackets 27. The opposite or rear end of each spring 17 is pivotally connected with its adjacent longitudinal frame member through a suitable link or shackle 29, which is pivoted both to the spring and the bracket 31 connected to the frame. The forward end of the spring which is connected to the fixed pin 23 is referred to as the "dead eye" end of the spring, while the other end is the shackle end of the spring.

It will, of course, be appreciated that the spring could be reversed with the shackle being disposed forwardly of the axle, but in most vehicles the spring is mounted as illustrated. The spring 17 is clamped at substantially its center to the axle housing by suitable means, such as U-bolts 34, so that the vehicle frame 15 is sprung adjacent its rear end on the rear axle housing 7 through the laterally spaced leaf springs 17. When the vehicle is accelerated or braked, torque is applied to the axle housing, causing the same to rotate about its axis, which extends laterally of the vehicle, causing the nose portion of the housing to swing upwardly or downwardly. This movement, if coupled with movement of the vehicle frame relative to the axle housing through the spring, may cause the nose end of the axle housing to strike the under side of the vehicle unless sufficient clearance or space is provided between the underside of the vehicle body and the axle housing. Furthermore, such extensive movement causes undesirably high loadings on the universal joint 13, which may tend to cause early failure of the same. Thus it is desirable to prevent rotation of the axle housing about its own axis and the prevention of such rotation will permit automotive stylists and designers to lower the body on the unsprung portion of the vehicle in accordance with modern trends and without danger of damage due to the axle housing striking the vehicle body or frame.

It will, however, be appreciated that different automobiles have different weights, different types of springs having different characteristics and other different characteristics, all of which affect the relative movement and the paths of movement between the frame and axle housing. The device of this invention is adapted for use with various types of vehicles and suspension systems, but is illustrated as used on only one type of vehicle and suspension sytem, but it is to be specifically understood that the scope of this invention is not limited merely to the illustrated forms.

The device includes bar means 37, which includes a first portion 39 extending laterally of the frame adjacent the axle housing, and a second portion comprising arms 41 and 43 extending generally longitudinally of the frame and rigid with the lateral bar portion 39. As illustrated, the bar means 37 is of a one piece construction with the portion 39 pivotally connected to the axle housing for rotation about an axis parallel to but offset from the axis of the axle 6. The bar portion 39 is connected to the axle housing by means of spaced apart, hat-shaped bracket members 45 and resilient blocks of rubber or the like 47, which are apertured at 49 so that the bar extends therethrough while the outer periphery of each resilient block 47 is confined by a bracket 45, which in turn is rigidly connected to the axle housing by any suitable means such as bolts and nuts 51. The arms 43 are illustrated as extending forwardly from the axle housing 7 but the important thing is that the free ends of the arms be disposed on the same side of the axle as the "dead eye" end of the leaf spring 17. The forward ends of the arms 41 and 43 are formed with laterally extending stub portions 53, each of which extends through an aperture 55 in a resilient block 57 supported on the vehicle frame by a hat sectioned bracket 59. The brackets 59 are rigidly connected to the frame by any suitable means such as bolts and nuts 61. It will also be noted that the bar 37 is disposed above the axle 6 but under certain circumstances and with certain types of installations it could be disposed below the axle without departing from the scope of the invention. Thus the free ends of the arms 41 and 43 are pivotally connected to the vehicle frame 15 for rotation about an axis extending substantially parallel to but longitudinally spaced from the axis of rotation of the bar portion 39. Furthermore, the bar is supported in resilient blocks of rubber or the like, and the resilient blocks permit distortion or deflection necessary to accommodate the movement of the free ends of the arms 41 and 43 as they move upwardly and downwardly through an arc. Also, the rubber blocks prevent noise, which might occur if metal to metal connections were employed.

The free ends of the arms 41 and 43 are connected to the vehicle frame and the bar portion 39 is connected to the axle housing in a desired relationship relative to each other and to the spring connections of the leaf spring to the axle housing and the vehicle frame to confine the movement of the axle relative to the frame to a predetermined desired path in accordance with the variables of each individual automotive design and suspension. In the design of leaf springs it is known that a leaf spring may be considered as a three-link mechanism such as illustrated and described in the Manual on Design and Application of Leaf Springs as published by the Society of Automotive Engineers, Inc. as their special publication No. 7. According to this publication, a leaf spring such as illustrated in the drawings can be considered as having a center of rotation at approximately the point indicated at 65 and the center 67 of the clamped portion of the spring will tend to move through an arc 68 swung from the point 65. The location of the point 65 will vary, of course, with different springs, and it is shown at the particular point merely for purposes of illustration. Preferably the points of connection of the arms 41 and 43 and the bar portion 39 with the vehicle frame and axle housing respectively, are located relative to the points 65 and 67 so as to provide a parallelogram arrangement for controlling the movement of the axle housing to a predetermined path. That is, the arms 41 and 43 and their adjacent spring portions between points 65 and 67 form two legs of the parallelogram. It will, however, be appreciated that a true parallelogram arrangement cannot be obtained because of the use of yieldable rubber blocks between the connections of the device and the axle housing and vehicle frame. Therefore, the arrangement will only approach a parallelogram but will not be a true parallelogram. It will, however, be appreciated that the arrangement is such that the arms 41 and 43 will confine the relative movement between the axle and the vehicle frame to a predetermined desired path of movement, and likewise it will be appreciated that the bar means prevents rotation of the axle housing about the axis of the axle and thus retains the nose portion of the housing in a substantially constant rotative position so that the vehicle frame and body can be lowered relative to the unsprung portion of the vehicle and so that less acceleration in the universal joint 13 will occur, which will tend to lessen any fatigue or failures of the joint. Furthermore, it will be appreciated that the bar means acts to eliminate lateral movement of the vehicle frame relative to the axle housing because of the connection of the bar with both the axle housing and frame. That is, while limited lateral movement between the vehicle frame and the axle housing may occur when no lateral stabilizer is provided, because of the flexibility of the springs, the addition of the device of this invention prevents such lateral movement and adds lateral stability to the vehicle, thus increasing its riding comfort and characteristics.

In addition to performing the function of a lateral stabilizer and an axle stabilizer, the device acts as an antiroll or sway bar for the rear part of the vehicle. That is, if one side of the vehicle and its corresponding arm 41 or 43, moves upwardly or downwardly relative to the other arm, then the intermediate bar portion 39 will become torsionally loaded and resist such movement of such one arm relative to the other and will thus resist tilting of one side of the vehicle frame or body relative to the other. The device of this invention therefore prevents, or at least materially reduces body tilting or rolling when a vehicle is, for example, rounding a corner or the like.

It will, of course, be appreciated that the device of this invention will not affect the ordinary suspension characteristics provided by the springs and shock absorbers because if the two arms 41 and 43 move upwardly and downwardly together there will be no torsional loading of the bar portion 49.

Figure 4:
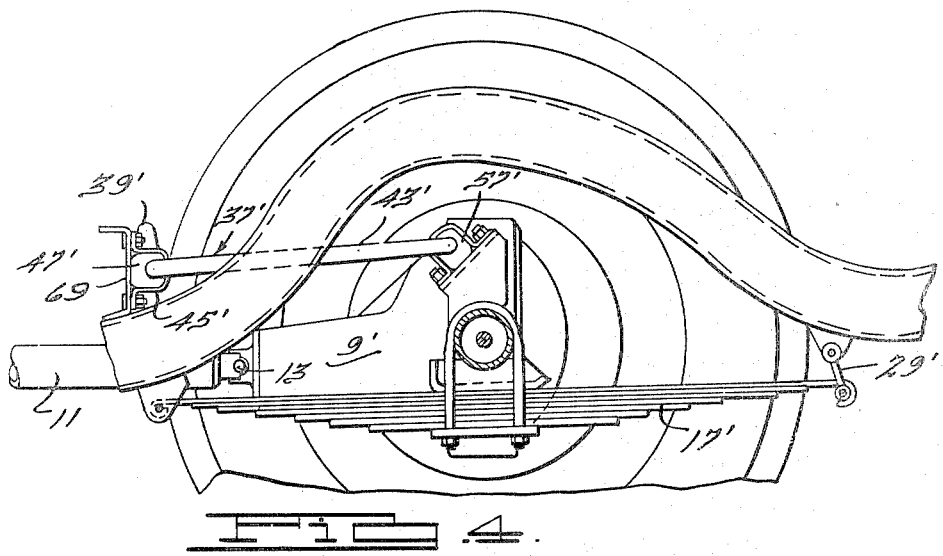
Fig. 4 is a view, partially in section and partially in elevation, of the structure illustrated in Fig. 3, taken along the line 4—4 thereof.

In the embodiment illustrated in Figs. 3 and 4, the bar means 37 is merely reversed. That is, the bar portion 39' is pivotally connected to a cross frame member 69 of the vehicle frame 15 adjacent opposite sides thereof, by suitable brackets 45' and rubber blocks 47'. The stub ends 53' of the arms, such as 43', are pivotally connected to the axle by brackets 59' and rubber blocks 57'. The device operates in the manner previously described and provides a substantially parallelogram arrangement, as previously described, the only difference between the embodiments being that in one embodiment the first bar portion is connected to the vehicle axle housing while in the other embodiment the first bar portion is connected with the vehicle frame. The reversal of the elements in this manner, however, does not affect the operation of the device.

What is claimed is:

1. In a vehicle, a frame, opposed ground engaging wheels, an axle extending laterally of the frame between said wheels and connected therewith, an axle housing in which said axle is rotatably supported, a leaf spring extending longitudinally of said frame adjacent each side thereof and being connected with said axle housing intermediate its ends, means pivotally connecting the opposite ends of each leaf spring with said frame, bar means including a first portion extending laterally of said frame and a second portion comprising arms extending longitudinally of said frame and rigid with the opposite ends of said lateral bar portion, means pivotally connecting one of said bar portions to said axle housing for rotation about an axis extending substantially parallel to but offset from the rotative axis of said axle, means pivotally connecting the other bar portion to said frame adjacent the opposite sides thereof for rotation about an axis extending substantially parallel to the axis of rotation of said first bar portion, said bar means being connected to said frame adjacent each side thereof at a point spaced longitudinally of the point of connection of said bar means to said axle housing, the points of connection of said bar means with said frame and the center of rotation of the adjacent spring portion being disposed in different vertical elevations so as to confine the movement of said axle housing relative to said frame to a substantially predetermined path while preventing any substantial rotation of said axle housing relative to said frame whereby at the same time said bar means acts to resist vertical movement of one side of said frame relative to the other and acts to prevent lateral movement of said frame relative to said axle housing.

2. In a vehicle, a frame, opposed ground engaging wheels, an axle extending laterally of the frame between said wheels and connected therewith, an axle housing in which said axle is rotatably supported, a leaf spring extending longitudinally of said frame adjacent each side thereof and being connected with said axle housing intermediate its ends, means pivotally connecting the opposite ends of each leaf spring with said frame, bar means including a first portion extending laterally of said frame and a second portion comprising arms extending longitudinally of said frame and rigid with the opposite ends of said lateral bar portion, means pivotally connecting one of said bar portions to said axle housing for rotation about an axis extending substantially parallel to but offset from the rotative axis of said axle, means pivotally connecting the other bar portion to said frame adjacent the opposite sides thereof for rotation about an axis extending substantially parallel to the axis of rotation of said first bar portion, said bar means being connected to said frame adjacent each side thereof at a point spaced longitudinally of the point of connection of said bar means to said axle housing, the points of connection of said bar means with said frame and the center of rotation of the adjacent spring portion being disposed in different vertical elevations in a relationship generally similar to the spacing between the spring at a point adjacent to the axle housing and the point of connection of said bar means to said axle housing so that a generally parallelogram arrangement is provided on each side of the vehicle for controlling the movement of the axle housing relative to the frame and preventing any substantial rotation of the axle housing relative to the frame, while at the same time said bar means acts to resist vertical movement of one side of said frame relative to the other side and acts to prevent lateral movement of said frame relative to said axle housing.

3. In a vehicle, a frame, opposed ground engaging wheels, an axle extending laterally of the frame between said wheels and connected therewith, an axle housing in which said axle is rotatably supported, a leaf spring extending longitudinally of said frame adjacent each side thereof and being connected with said axle housing intermediate the ends thereof, means pivotally connecting the opposite ends of each leaf spring with said frame, one-piece bar means including a first portion extending laterally of said frame and a second portion comprising arms extending longitudinally of said frame and rigid with the opposite ends of said lateral bar portion, means pivotally connecting one of said bar portions to said axle housing for rotation about an axis extending substantially parallel to but offset from the rotative axis of said axle, means pivotally connecting the other bar portion to said frame adjacent the opposite sides thereof for rotation about an axis substantially parallel to the axis of rotation of said first bar portion, said means pivotally connecting said bar portions to said frame and axle housing including yieldable members permitting limited movement of said bar portions relative to the axle housing and frame due to the flexibility of the yieldable members, said bar means being connected to said frame adjacent each side thereof at a point spaced longitudinally of the point of connection of said bar means to said axle housing, the points of connection of said bar means with said frame and the center of rotation of the adjacent spring portion being disposed in different vertical elevations so as to coact with the spring to confine the movement of the axle housing relative to the frame to a substantially predetermined path while preventing any substantial rotation of the axle housing relative to the frame and at the same time resisting vertical movement of one side of said frame relative to the other side thereof and preventing lateral movement of said frame relative to said axle housing.

4. In a vehicle, a frame, opposed ground engaging wheels, an axle extending laterally of the frame between said wheels and connected therewith, an axle housing in which said axle is rotatably supported, a leaf spring extending longitudinally of said frame adjacent each side thereof and being connected intermediate its ends with said axle housing, means pivotally connecting the opposite ends of each leaf spring with said frame, bar means including a first portion extending laterally of said frame and a second portion comprising arms extending longitudinally of said frame and rigid with the opposite ends of said lateral bar portion, means pivotally connecting one of said bar portions to said axle housing above said axle to permit said bar portion to rotate about an axis extending substantially parallel to but offset from the rotative axis of said axle, means pivotally connecting the other bar portion to said frame adjacent the opposite sides thereof for rotation about an axis substantially parallel to the axis of rotation of said first bar portion, said bar means being connected to said frame adjacent each side thereof at a point spaced forwardly of the point of connection of said bar means to said axle housing, each point of connection of said bar means with said frame being disposed above said leaf spring and being spaced relative to the center of rotation of the adjacent spring portion so as to confine the movement of said axle housing relative to said frame to a substantially predetermined path, while preventing any substantial rotation of the axle housing relative to the frame whereby at the same time said bar means acts to resist vertical movement of one side of said frame relative to the other side and acts to prevent lateral movement of said frame relative to said axle housing.

5. In a vehicle, a frame, opposed ground engaging wheels, an axle extending laterally of the frame between said wheels and connected therewith, an axle housing in which said axle is rotatably supported, a leaf spring extending longitudinally of said frame adjacent each side thereof, and being rigidly connected intermediate its ends with said axle housing, means pivotally connecting one end of each leaf spring with said frame for rotation about a fixed axis, shackle means pivotally connecting the opposite end of each leaf spring with said frame, bar means including a first portion extending laterally of said frame and a second portion comprising arms extending longitudinally of said frame and rigid with the opposite ends of said lateral bar portion, means pivotally connecting one of said bar portions to said axle housing to permit said bar portion to rotate about an axis extending substantially parallel to but offset from the rotative axis of said axle, means pivotally connecting the other bar portion to said frame adjacent the opposite sides thereof for rotation about an axis substantially parallel to the axis of rotation of said first bar portion, said other bar portion being pivotally connected to the frame adjacent the ends of the springs which rotate about a fixed axis, the points of connection of said bar means with said frame and the center of rotation of the adjacent spring portion being disposed in different vertical elevations so as to coact with the spring to confine the movement of the axle housing relative to the frame to a substantially predetermined path, while preventing any substantial rotation of said axle housing relative to said frame and at the same time resisting vertical movement of one side of said frame relative to the other side thereof and preventing lateral movement of said frame relative to said axle housing.

References Cited in the file of this patent
UNITED STATES PATENTS

| | | |
|---|---|---|
| 1,406,935 | Crane | Feb. 14, 1922 |
| 1,971,959 | Huntman | Aug. 28, 1934 |
| 2,179,016 | Leighton | Nov. 7, 1939 |